UNITED STATES PATENT OFFICE.

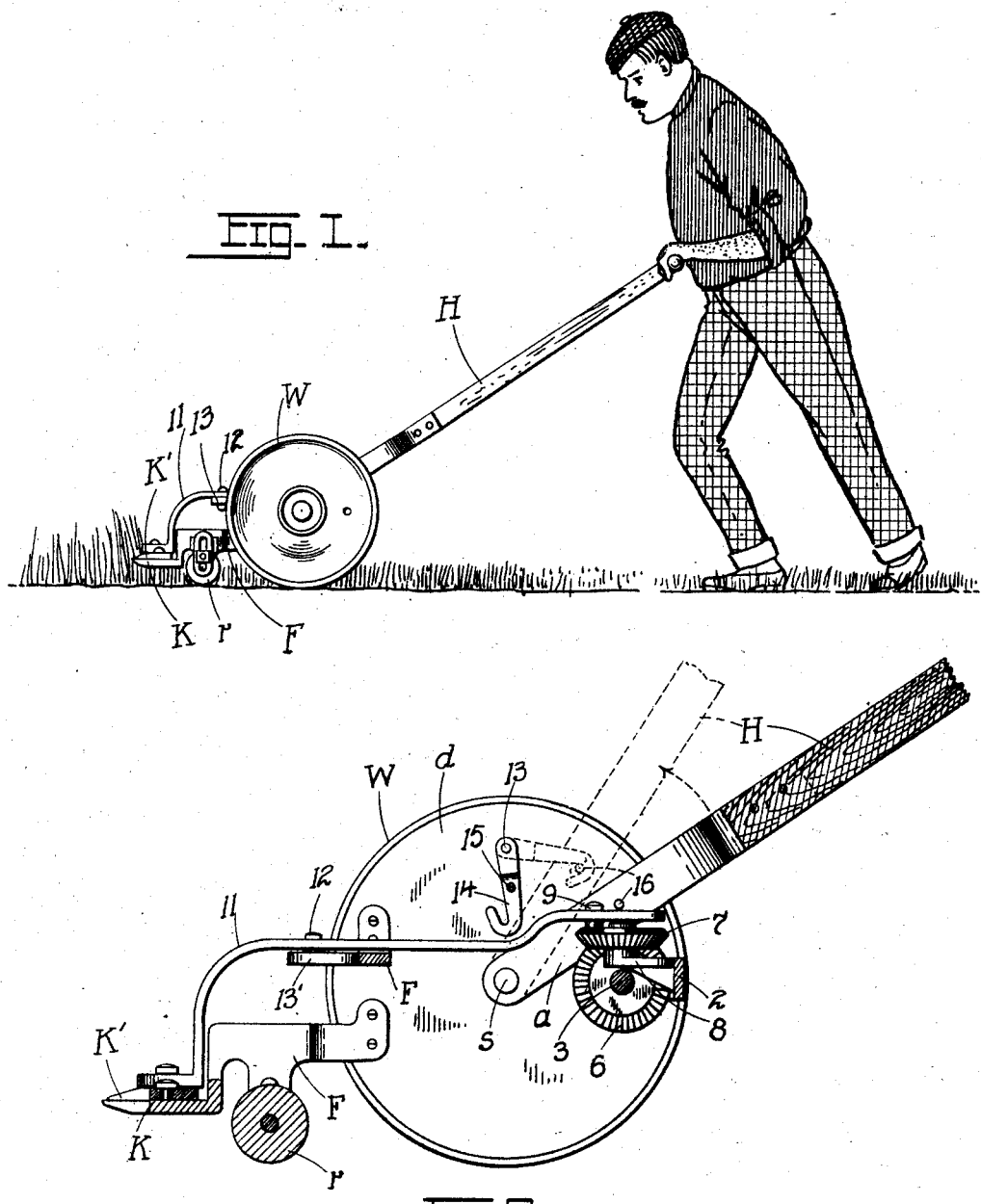

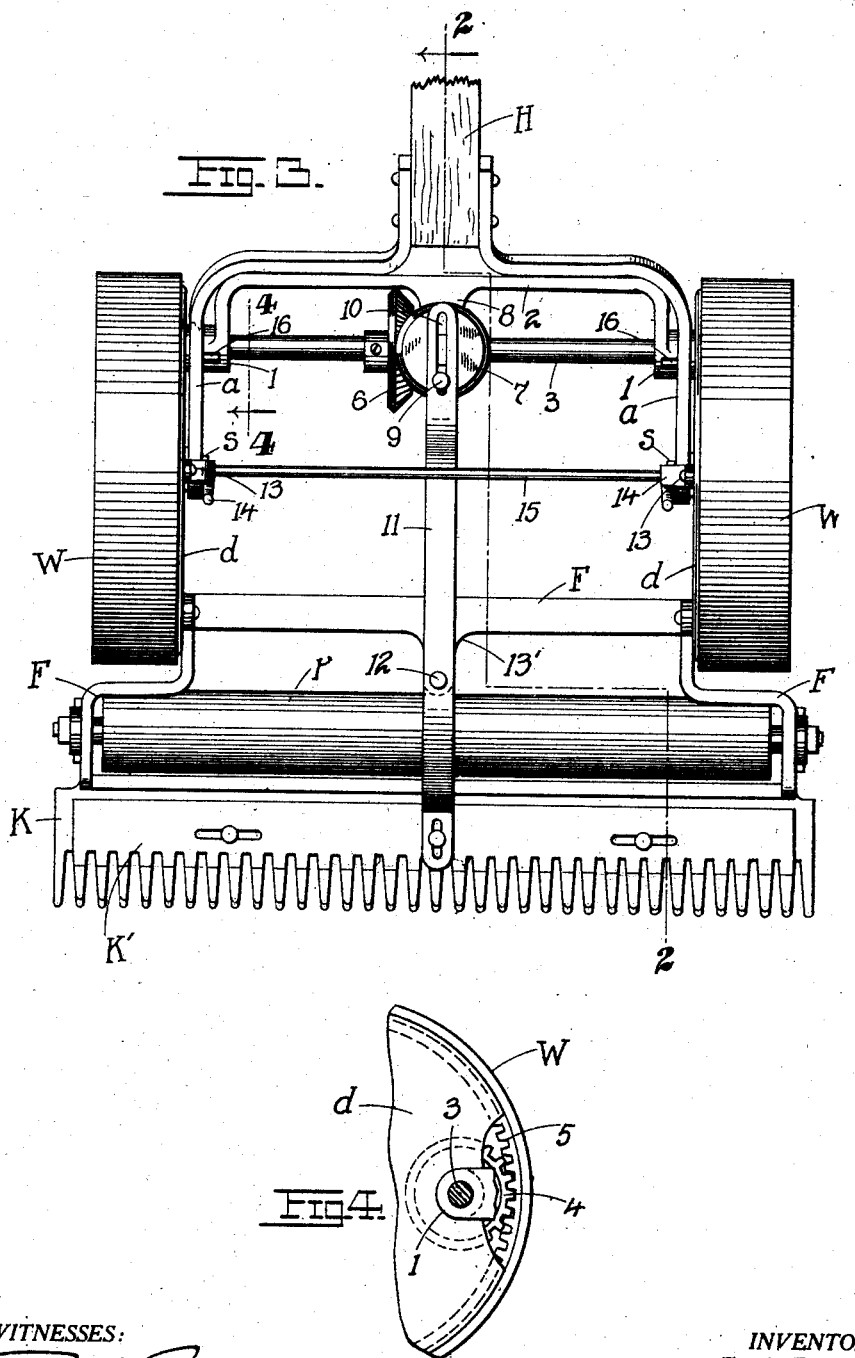

FRED FISHER, OF IRONTON, MISSOURI, ASSIGNOR TO I. G. WHITWORTH, JR., OF IRONTON, MISSOURI.

LAWN-MOWER.

No. 907,138.      Specification of Letters Patent.      Patented Dec. 22, 1908.

Application filed September 4, 1908. Serial No. 451,676.

*To all whom it may concern:*

Be it known that I, FRED FISHER, citizen of the United States, residing at Ironton, in the county of Iron and State of Missouri, have invented certain new and useful Improvements in Lawn-Mowers, of which the following is a full, clear, and exact description, reference being had to the accompanying drawings, forming a part hereof.

My invention has relation to improvements in lawn-mowers; and it consists in the novel details of construction more fully set forth in the specification and pointed out in the claim.

In the drawings, Figure 1 is a side elevation of the lawn mower; Fig. 2 is a longitudinal vertical section on the line 2—2 of Fig. 3; Fig. 3 is a top plan; and Fig. 4 is a sectional detail on line 4—4 of Fig. 3, parts being broken away.

The object of my invention is to construct a lawn mower which shall have a minimum number of operating parts; one in which the blades can be conveniently swung out of range of the grass to be cut or out of range of obstructions which might be encountered by the blades when the mower is not in service; one which will cut a wide swath so as to easily reach the edges of the lawn in proximity to a fence or wall, and one possessing further and other advantages better apparent from a detailed description of the invention which is as follows:—

Referring to the drawings, F represents the frame supporting the stationary cutting knife or blade $k$, said frame being secured to the disk $d$ about which the carrying wheels W, W, of the mower revolve. The disks $d$ have formed on their exposed faces the hollow bearings or bosses 1, 1, forming the terminals of a connecting yoke 2. The bosses form bearings for the drive-shaft 3 whose terminals carry the pinions 4 which in turn mesh with the inner toothed gears 5 on the inside of the peripheries, or treads of the wheels W. On the shaft 3 is mounted a bevel gear 6 which meshes with a similar gear 7 on the bracket arm 8 formed with the yoke 2, the upper face of the gear 7 being provided with a pin 9 which traverses a slot 10 in the long arm of a lever 11 oscillating about a stud or pin 12 on the bracket arm 13′ of the frame F, the short arm of the lever imparting a reciprocating movement to the upper movable blade or knife $k'$. The depth of the cut is regulated by a roller $r$ which is mounted in bearings in which it may be adjusted to conform to the depth of cut desired. The features described however are well known and form no part of the present invention, and there is therefore no occasion to enter into further detailed description relative thereto.

The handle-bar H terminates at the base in forks or arms $a$, $a$, the ends of which are pivoted about studs $s$, $s$, projecting from the centers of the disks $d$, $d$, to allow for the oscillation of the handle bar to any convenient angle in pushing the machine. Suspended from pins or studs 13 carried by the disks $d$ at points substantially above the studs $s$ are hooks 14, 14 connected by a cross-bar 15 by which both hooks may be actuated or swung about their studs 13 for a purpose now to appear. The fork members $a$, $a$, are provided at convenient points with pins 16, 16, which, when the handle bar H has been swung sufficiently toward the studs 13 may be engaged by the hooks 14 (see dotted position of parts in Fig. 2). With the handle-bar H thus coupled to the hooks 14, it is apparent that a depression or oscillation of the handle-bar back to its original position as shown in the full illustration in Fig. 2, will rotate the disks $d$, $d$ about their common axis (passing through the studs $s$, $s$), and elevate the knives $k$, $k'$ out of proximity to the ground, so that the machine can now be wheeled from place to place and the knives be in no danger of encountering any obstructions. The handle is therefore coupled to the hooks 14 when it is desired to draw the machine along without permitting the knives to perform any work, the knives pointing upward through an angle depending on the angle through which the handle-bar locked to the disks has been depressed. The knives in the present machine extend beyond the wheels W, W, so that it makes it possible to cut in corners, or in close proximity to walls and fences.

Having described my invention, what I claim is:—

In a lawn-mower, a pair of disks, wheels rotatable about the same, a frame projecting forward of the disks, a stationary blade secured to the outer end of the frame, a reciprocating blade actuated from the wheels coöperating with the stationary blade, a forked handle-bar rotatable about the common axis of the disks, a pair of hooks swung from the inner faces of the disks, at points removed from the centers thereof, a crossbar connecting the hooks, and pins on the handle-bar forks adapted to be engaged by the hooks upon a tilting of the handle-bar in proper direction, the parts operating substantially as, and for the purpose set forth.

In testimony whereof I affix my signature, in presence of two witnesses.

FRED FISHER.

Witnesses:
MANN RINGO,
R. P. WHITWORTH.